United States Patent
Kobayashi et al.

(10) Patent No.: US 12,168,298 B2
(45) Date of Patent: Dec. 17, 2024

(54) CABLE TERMINAL END DETECTION METHOD AND HAND

(71) Applicant: SEIKO EPSON CORPORATION, Tokyo (JP)

(72) Inventors: Masato Kobayashi, Kobe (JP); Daiki Togashi, Chino (JP); Takuya Wakayama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 382 days.

(21) Appl. No.: 17/584,414

(22) Filed: Jan. 26, 2022

(65) Prior Publication Data

US 2022/0234197 A1  Jul. 28, 2022

(30) Foreign Application Priority Data

Jan. 28, 2021  (JP) .................. 2021-011891

(51) Int. Cl.
*B25J 9/16* (2006.01)
*B25J 9/02* (2006.01)
(Continued)

(52) U.S. Cl.
CPC .......... *B25J 9/1612* (2013.01); *B25J 9/023* (2013.01); *B25J 9/1664* (2013.01); *B25J 9/1669* (2013.01);
(Continued)

(58) Field of Classification Search
CPC ............ H01R 43/00; H01R 43/28; G05B 2219/39506; B25J 9/1612
See application file for complete search history.

(56) References Cited

U.S. PATENT DOCUMENTS

2004/0099108 A1\* 5/2004 Viviroli ................ H02G 1/1256
83/33
2009/0133508 A1\* 5/2009 Johansson ............... G01L 5/228
73/862.046
(Continued)

FOREIGN PATENT DOCUMENTS

CN       102773865 A      11/2012
JP       2014176917 A      9/2014
(Continued)

OTHER PUBLICATIONS

Search Report of the First Office Action CN Application No. 2022100866437 issued Apr. 29, 2023.

*Primary Examiner* — Stephen Holwerda
*Assistant Examiner* — Tristan J Greiner
(74) *Attorney, Agent, or Firm* — Samson G. Yu (57) ABSTRACT

A cable terminal end detection method includes a gripping step for gripping, using a hand including a first gripping section and a second gripping section disposed to be separated on an X axis and configured to open and close in a direction along a Z axis, a cable in two places separated in a longitudinal direction with the first gripping section and the second gripping section, a moving step for, in a state in which the cable is gripped by the hand, moving the cable to the first gripping section side in a direction along the X axis relatively to the hand, and a detecting step for detecting, with a tactile sensor disposed in the second gripping section to be in contact with the cable, that the cable has slipped out from the second gripping section and detecting that a terminal end of the cable is located between the first gripping section and the second gripping section.

6 Claims, 10 Drawing Sheets

(51) Int. Cl.
*B25J 13/08* (2006.01)
*H01R 43/00* (2006.01)

(52) U.S. Cl.
CPC .......... *B25J 9/1674* (2013.01); *B25J 13/084* (2013.01); *H01R 43/00* (2013.01)

(56) References Cited

U.S. PATENT DOCUMENTS

| | | | | |
|---|---|---|---|---|
| 2012/0290133 | A1* | 11/2012 | Goto | B25J 15/0253 |
| | | | | 294/213 |
| 2014/0277732 | A1* | 9/2014 | Shiota | B25J 9/1697 |
| | | | | 700/258 |
| 2014/0365009 | A1* | 12/2014 | Wettels | B25J 19/023 |
| | | | | 700/258 |
| 2019/0240830 | A1* | 8/2019 | Lim | B25J 15/0226 |
| 2020/0061814 | A1 | 2/2020 | Hirata | |
| 2021/0116594 | A1* | 4/2021 | Houser | H01B 13/0003 |

FOREIGN PATENT DOCUMENTS

| | | | |
|---|---|---|---|
| JP | 2018140455 A | | 9/2018 |
| JP | 2019141957 A | * | 8/2019 |

* cited by examiner

CABLE TERMINAL END DETECTION METHOD AND HAND

The present application is based on, and claims priority from JP Application Serial Number 2021-011891, filed Jan. 28, 2021, the disclosure of which is hereby incorporated by reference herein in its entirety.

BACKGROUND

1. Technical Field

The present disclosure relates to a cable terminal end detection method and a hand.

2. Related Art

For example, JP-A-2014-176917 (Patent Literature 1) describes a robot device that can detect the terminal end of the cable. The robot device described in Patent Literature 1 slides a gripping section to the terminal end side of the cable while gripping the cable with the gripping section and detects force generated by contact of the detecting section with a connector connected to the terminal end of the cable to thereby detect the terminal end of the cable.

However, in such a method, unless a member having a larger diameter than the cable such as the connector is disposed at the terminal end of the cable, the terminal end of the cable cannot be detected.

SUMMARY

A cable terminal end detection method according to an aspect is a cable terminal end detection method for detecting a terminal end of a linear cable including, when two axes crossing each other are represented as an X axis and a Z axis: a gripping step for gripping, using a hand including a first gripping section and a second gripping section disposed to be separated on the X axis and configured to open and close in a direction along the Z axis, the cable in two places separated in a longitudinal direction with the first gripping section and the second gripping section; a moving step for, in a state in which the cable is gripped by the hand, moving the cable to the first gripping section side in a direction along the X axis relatively to the hand; and a detecting step for detecting, with a tactile sensor disposed in the second gripping section to be in contact with the cable, that the cable has slipped out from the second gripping section and detecting that the terminal end of the cable is located between the first gripping section and the second gripping section.

A hand according to an aspect includes, when two axes orthogonal to each other are represented as an X axis and a Z axis: a first gripping section and a second gripping section configured to relatively move in a direction along the X axis and open and close in a direction along the Z axis; a tactile sensor disposed in the second gripping section; and an elastic body covering the tactile sensor.

DESCRIPTION OF EXEMPLARY EMBODIMENTS

A cable terminal end detection method and a hand according to the present disclosure are explained in detail below with reference to an embodiment shown in the accompanying drawings.

Figure 1:
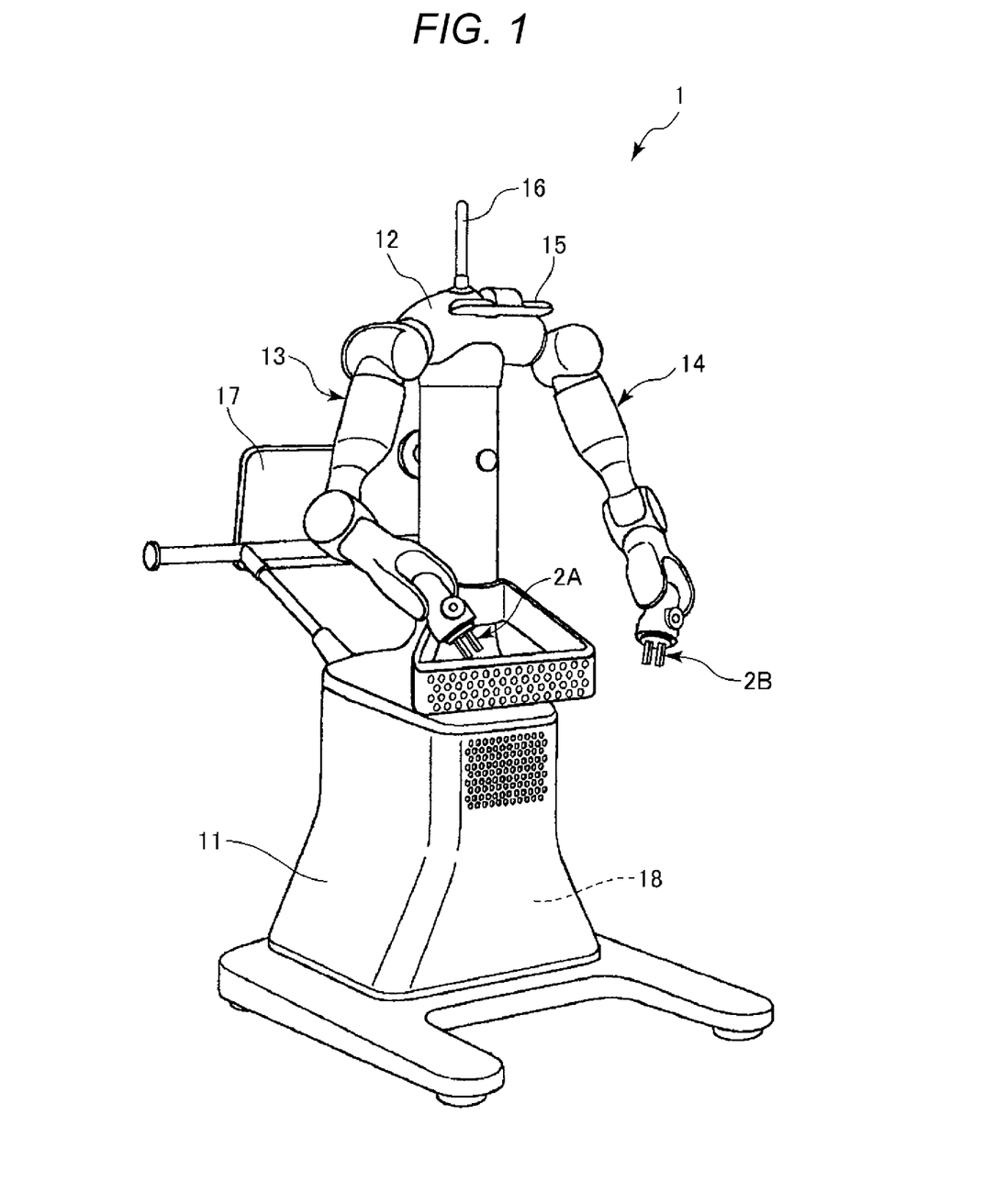
FIG. 1 is a perspective view showing an overall configuration of a robot according to a preferred embodiment.
Figure 2:
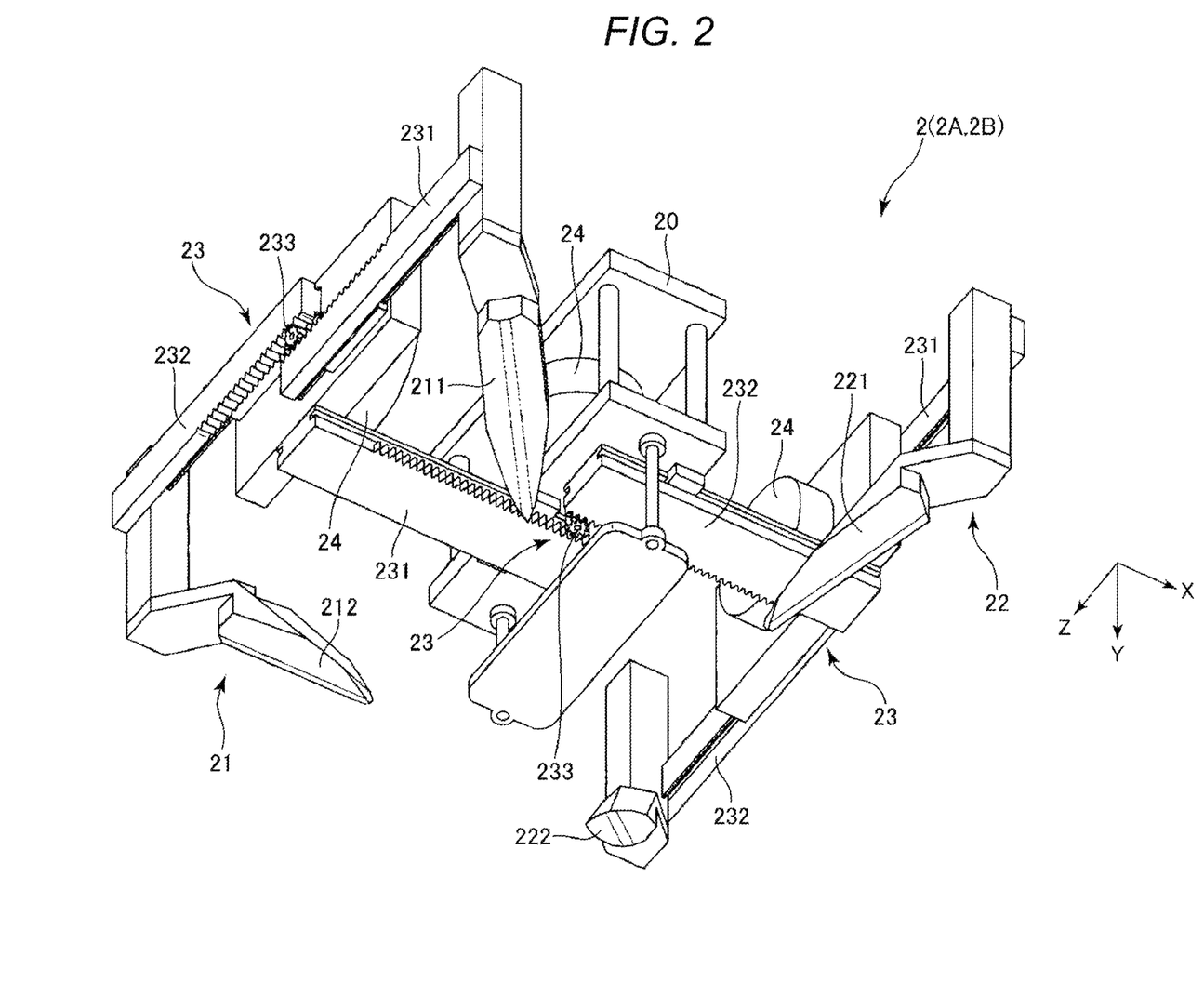
FIG. 2 is a perspective view showing a hand included in the robot shown in FIG. 1.
Figure 3:
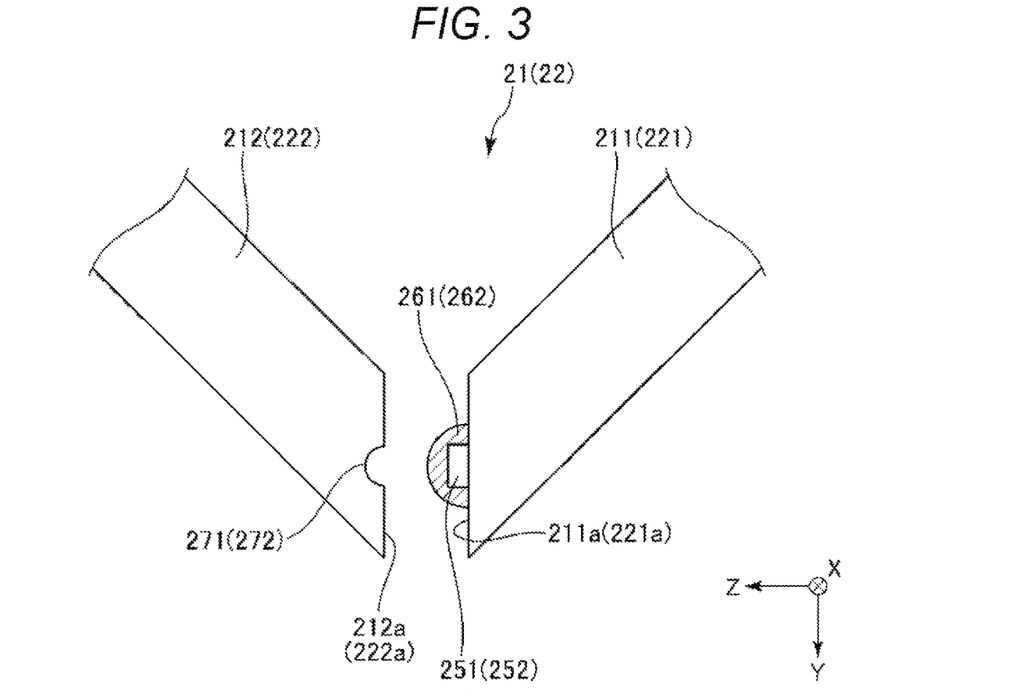
FIG. 3 is a sectional view showing a fingertip portion of the hand shown in FIG. 2.
Figure 4:
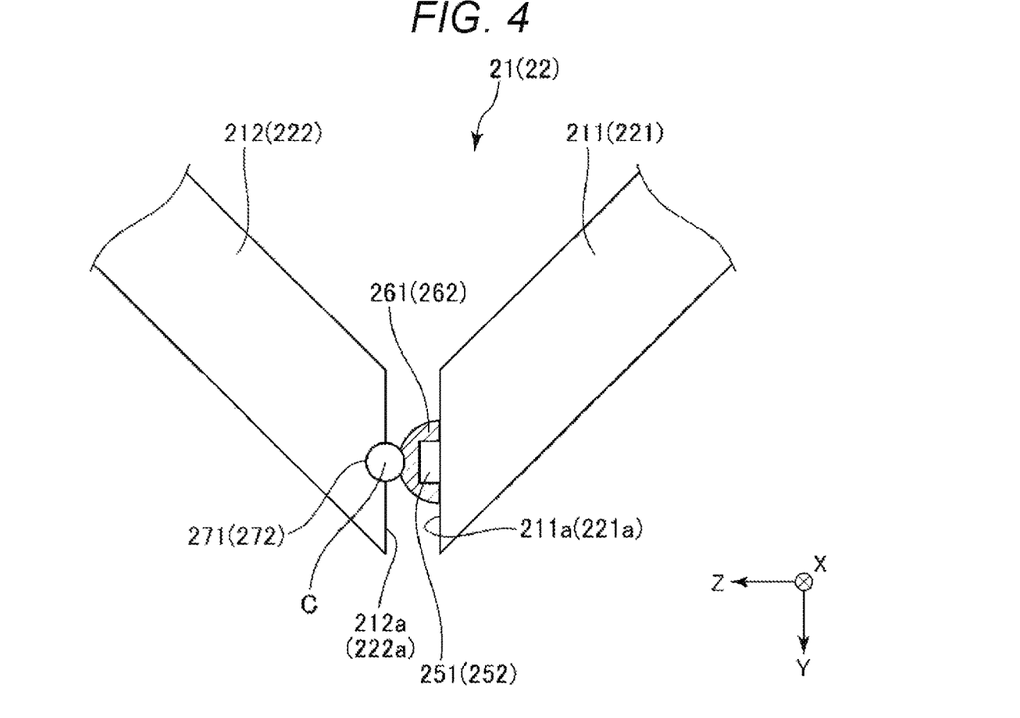
FIG. 4 is a sectional view showing the fingertip portion of the hand shown in FIG. 2.
Figure 5:
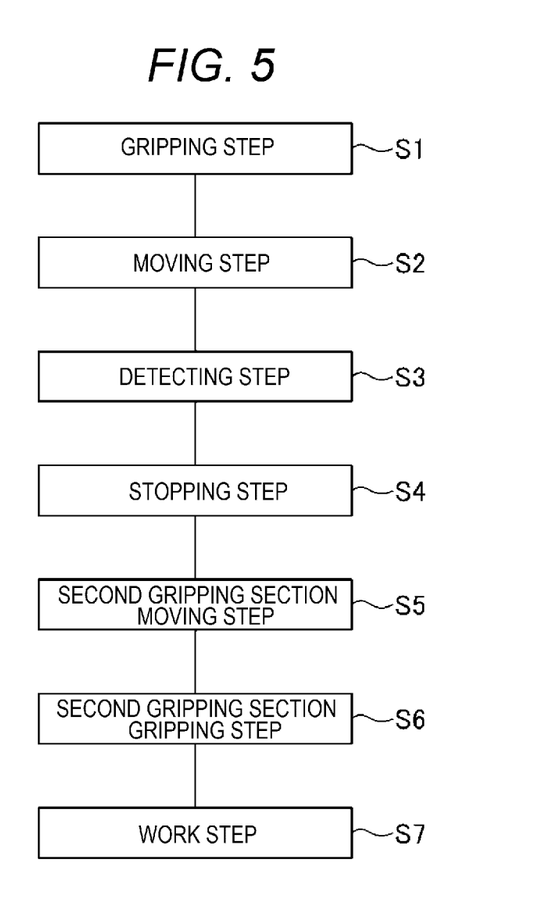
FIG. 5 is a flowchart showing a terminal end detection process for a cable.
Figure 6:
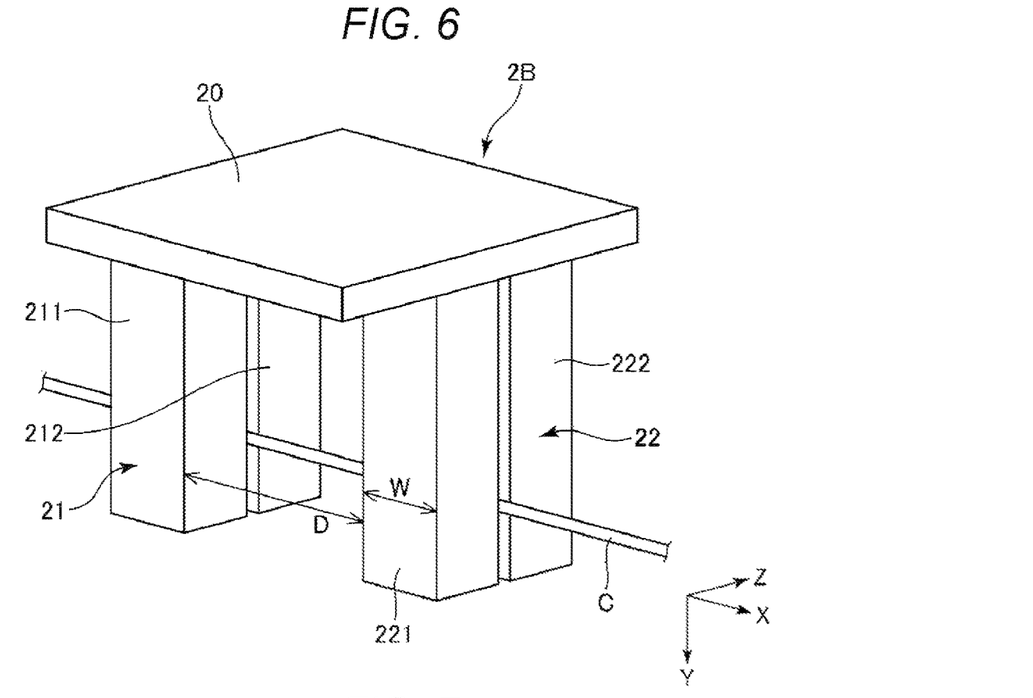
FIG. 6 is a perspective view for explaining a terminal end detection method for a cable.
Figure 7:
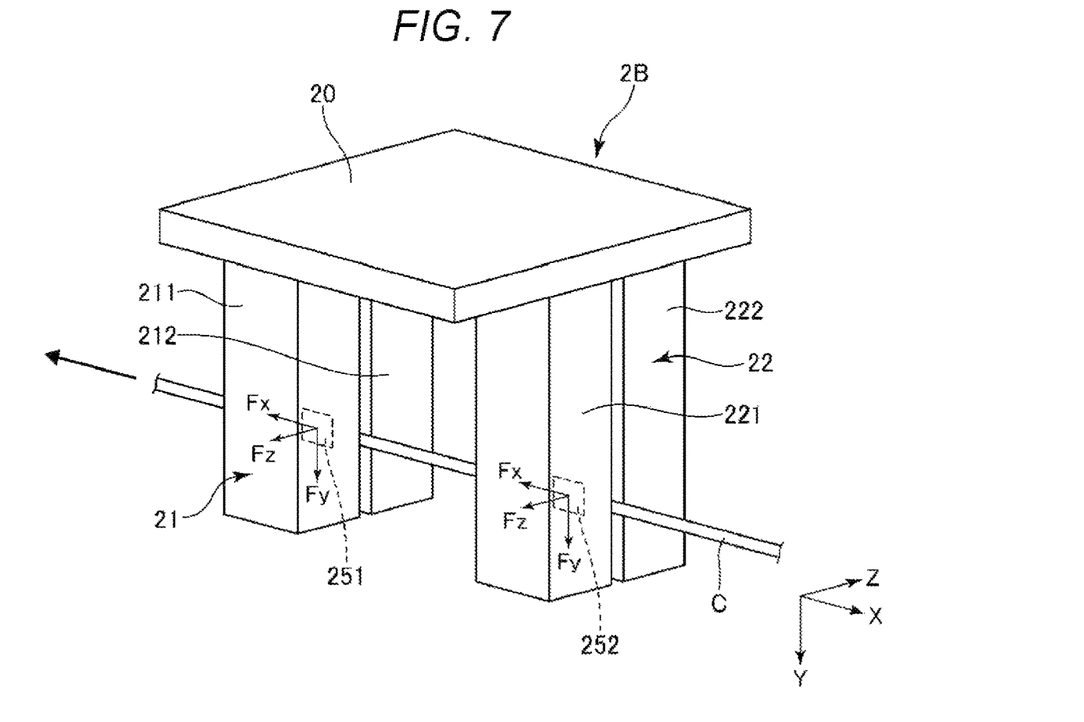
FIG. 7 is a perspective view for explaining the terminal end detection method for the cable.
Figure 8:
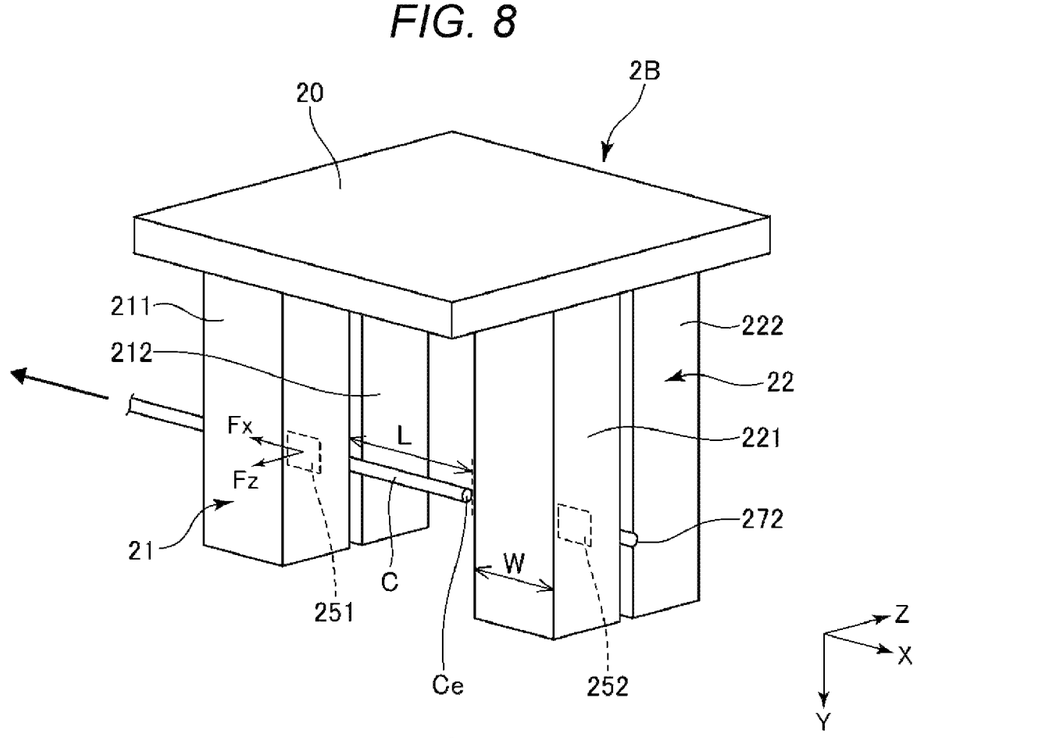
FIG. 8 is a perspective view for explaining the terminal end detection method for the cable.
Figure 9:
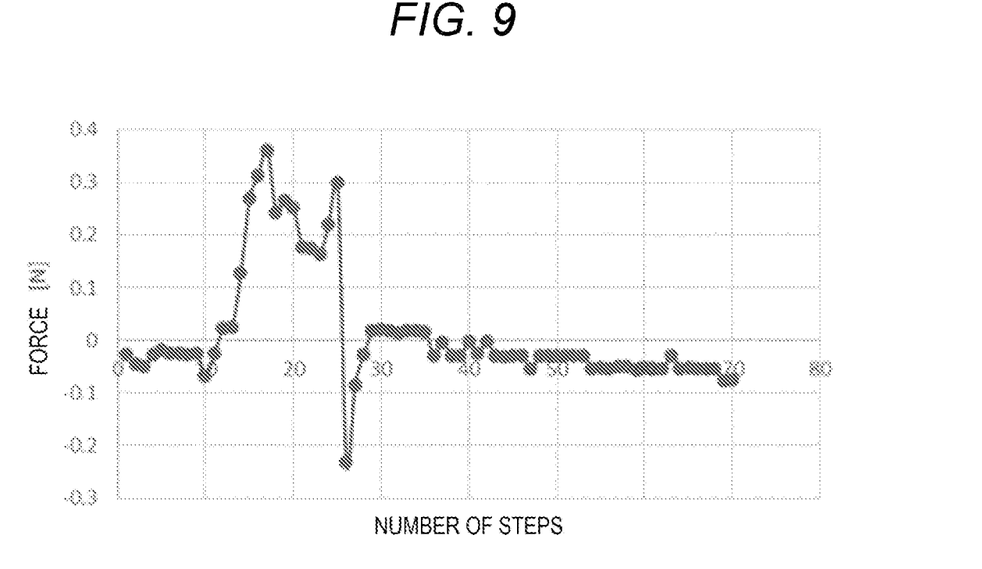
FIG. 9 is a graph showing force in an X-axis direction applied during terminal end detection work.
Figure 10:
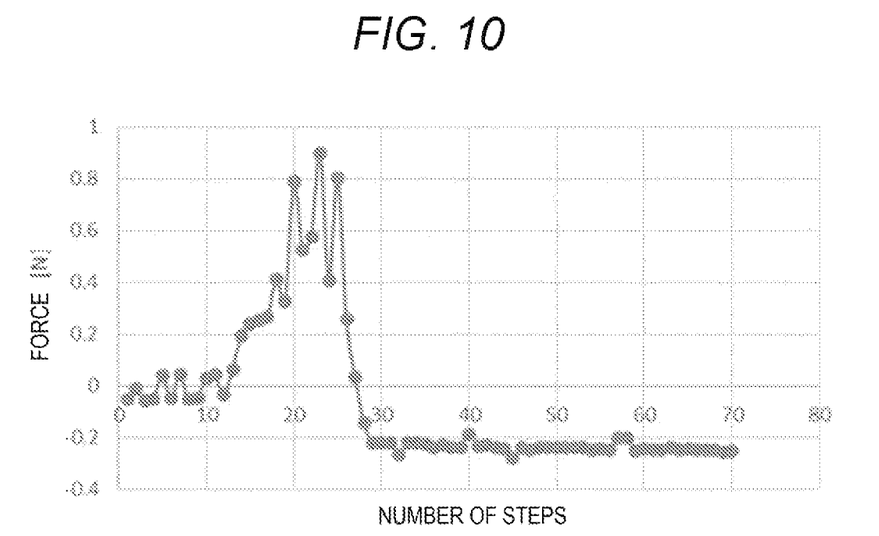
FIG. 10 is a graph showing force in a Z-axis direction applied during the terminal end detection work.
Figure 11:
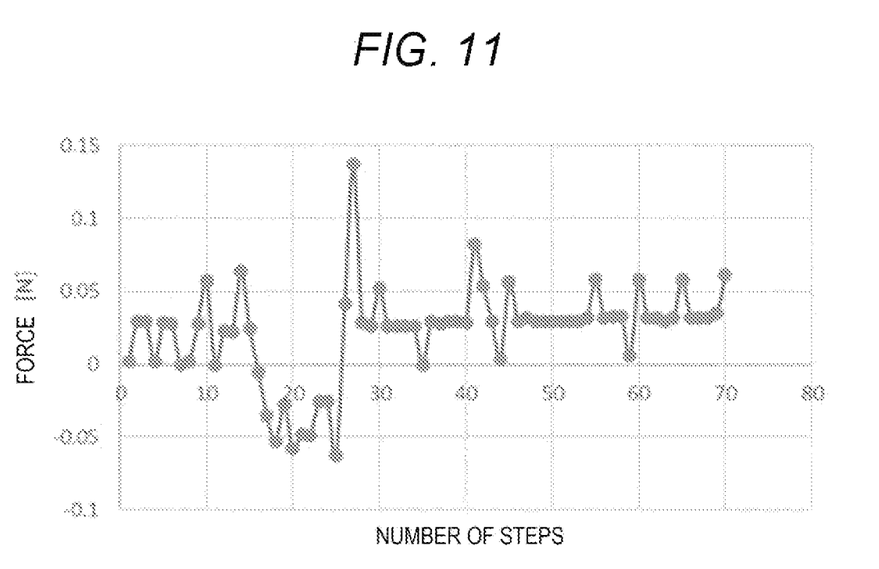
FIG. 11 is a graph showing force in a Y-axis direction applied during the terminal end detection work.

FIG. 1 is a perspective view showing an overall configuration of a robot according to a preferred embodiment. FIG. 2 is a perspective view showing a hand included in the robot shown in FIG. 1. FIGS. 3 and 4 are respectively sectional views showing a fingertip portion of the hand shown in FIG. 2. FIG. 5 is a flowchart showing a terminal end detection process for a cable. FIGS. 6 to 8 are respectively perspective views for explaining a terminal end detection method for a cable. FIG. 9 is a graph showing force in an X-axis direction applied during terminal end detection work. FIG. 10 is a graph showing force in a Z-axis direction applied during the terminal end detection work. FIG. 11 is a graph showing force in a Y-axis direction applied during the terminal end detection work. FIGS. 12 to 16 are respectively perspective views for explaining a terminal end detection method for a cable.

In the following explanation, for convenience of explanation, a X axis, a Y axis, and a Z axis, which are three axes orthogonal to one another, are illustrated in FIGS. 2 to 4, FIGS. 6 to 8, and FIGS. 12 to 16, a direction along the X direction is referred to as "X-axis direction" as well, a direction along the Y axis is referred to as "Y-axis direction" as well, and a direction along the Z axis is referred to as "Z-axis direction" as well. An arrow direction distal end side of the axes is referred to as "plus side" as well and the opposite side of the arrow direction distal end side is referred to as "minus side" as well.

A robot 1 shown in FIG. 1 includes a base 11, a body 12 turnably coupled to the base 11, a pair of multi-joint arms 13 and 14 coupled to the left and the right of the body 12, a stereo camera 15 and a signal lamp 16 provided in the body 12, a monitor 17 provided on the back side of the body 12, hands 2A and 2B attached to the distal end portions of the multi-joint arms 13 and 14, and a robot control device 18 that controls these sections.

The robot 1 having such a configuration performs predetermined work while checking the positions of a workpiece, a tool, and the like using the stereo camera 15. In particular, in this embodiment, the robot 1 performs work for detecting the terminal end of a cable C. States of the robot 1, for example, a driving state, a normal stop state, and an abnormal stop state can be easily checked using the signal lamp 16. Since information concerning the robot 1 is displayed on the monitor 17, the states of the robot 1 can be simply checked. The monitor 17 is, for example, a touch panel. It is possible to switch a display screen, give a command to the robot 1, and change the given command by operating the touch panel.

The robot control device 18 receives a position command for the robot 1 from a not-shown host computer and controls driving of the sections to locate the body 12 and the multi-joint arms 13 and 14 in positions corresponding to the position command. The robot control device 18 is configured from, for example, a computer and includes a processor (CPU) that processes information, a memory communicably coupled to the processor, and an external interface. Various programs executable by the processor are stored in the memory. The processor reads and executes the various programs and the like stored in the memory.

The hands 2A and 2B are briefly explained. Since the hands 2A and 2B have the same configuration, in the following explanation, the hands 2A and 2B are collectively referred to as "hand 2".

As shown in FIG. 2, the hand 2 includes a base 20 coupled to the distal end portions of the multi-joint arms 13 and 14 and a first gripping section 21 and a second gripping section 22 supported by the base 20. The first gripping section 21 includes two finger sections 211 and 212 arranged in the Z-axis direction and capable of opening and closing in the Z-axis direction. Similarly, the second gripping section 22 includes two finger sections 221 and 222 arranged in the Z-axis direction and capable of opening and closing in the Z-axis direction. The first and second gripping sections 21 and 22 can relatively move in the X-axis direction and are capable of approaching and separating from each other. The opening and closing of the finger sections 211 and 212, the opening and closing of the finger sections 221 and 222, and the approach and the separation of the first and second gripping sections 21 and 22 are realized by a rack and pinion mechanism 23 including a pair of racks 231 and 232 and a pinion 233 and a motor 24 that rotates the pinion 233.

As shown in FIGS. 3 and 4, a tactile sensor 251 is disposed on a surface 211a of the finger section 211 opposed to the finger section 212. When the cable C is gripped by the finger sections 211 and 212, the tactile sensor 251 receives reaction from the cable C. Similarly, a tactile sensor 252 is disposed on a surface 221a of the finger section 221 opposed to the finger section 222. When the cable C is gripped by the finger sections 221 and 222, the tactile sensor 252 receives reaction from the cable C. The tactile sensors 251 and 252 can respectively independently detect forces in the X-axis direction, the Y-axis direction, and the Z-axis direction. The tactile sensors 251 and 252 are not particularly limited if the tactile sensors 251 and 252 can exert functions thereof.

The tactile sensors 251 and 252 are respectively covered by elastic bodies 261 and 262 configured by an elastic material such as a rubber material. The elastic bodies 261 and 262 are deformed to follow a movement of the cable C, whereby force corresponding to the movement of the cable C is simply transmitted to the tactile sensors 251 and 252. Therefore, as explained below, it is possible to more accurately detect the terminal end of the cable C.

A groove 271 with in the cable C engages is disposed in a position opposed to the tactile sensor 251 on a surface 212a of the finger section 212 opposed to the finger section 211. As shown in FIG. 4, by causing the cable C to engage with the groove 271, it is possible to more surely bring the cable C and the elastic body 261 into contact and transmit the reaction from the cable C to the tactile sensor 251. It is also possible to effectively suppress unintended separation of the cable C from the first gripping section 21. Similarly, a groove 272 in which the cable C engages is disposed in a position opposed to the tactile sensor 252 on a surface 222a of the finger section 222 opposed to the finger section 221. As shown in FIG. 4, by causing the cable C to engage with the groove 272, it is possible to more surely bring the cable C and the elastic body 262 into contact and transmit the reaction from the cable C to the tactile sensor 252. It is also possible to effectively suppress unintended separation of the cable C from the second gripping section 22.

Such a hand 2 has a configuration suitable for performing a terminal end detection method for the cable C explained below. Therefore, it is easier to carry out the terminal end detection method for the cable C. The configuration of the hand 2 is not particularly limited as long as the hand 2 includes the first and second gripping sections 21 and 22 and the tactile sensor 252 disposed in the second gripping section 22.

The configuration of the robot 1 is briefly explained above. Subsequently, the terminal end detection method for the cable C performed using the robot 1 is explained in detail. The cable C is not particularly limited. However, a cable, on the outer circumferential surface of which unevenness is substantially absent and to the terminal end of which a terminal such as a connector is not connected, is preferable. That is, the cable C preferably has a shape that can be smoothly pulled out from the second gripping section 22 without being caught by the second gripping section 22 in a moving step S2 explained below. The cable C having such a shape is suitable for the terminal end detection method in this embodiment.

As shown in FIG. 5, the terminal end detection method for the cable includes a gripping step S1, a moving step S2, a detecting step S3, a stopping step S4, a second gripping section moving step S5, a second gripping section gripping step S6, and a work step S7. The steps are explained below in order below. In FIGS. 6 to 16 referred to below, for convenience of explanation, the hands 2A and 2B are simplified and illustrated.

Gripping Step S1

First, the robot 1 grips the cable C with the hands 2A and 2B. The hand 2A may grip the cable C in any way. On the other hand, as shown in FIG. 6, the hand 2B separates the first gripping section 21 and the second gripping section 22 in the X-axis direction and grips to sandwich, with the first gripping section 21 and the second gripping section 22, the cable C from the Z-axis direction in two places separated in the longitudinal direction of the cable C. In a state in which the cable C is gripped, as shown in FIG. 4, the cable C engages with the grooves 271 and 272 and comes into contact with the elastic bodies 261 and 262. Therefore, the elastic bodies 261 and 262 are deformed to be crushed in the Z-axis direction. Force in the Z-axis direction acts on the tactile sensors 251 and 252.

The hand 2A strongly and firmly grips the cable C. On the other hand, the hand 2B loosely grips the cable C with light force as long as the cable C does not separate from the first and second gripping sections 21 and 22 and the tactile sensors 251 and 252 can detect reaction from the cable C. Consequently, in the following moving step S2, it is possible to slide the cable C with respect to the hand 2B with smaller force. Therefore, it is possible to further reduce tensile stress applied to the cable C and suppress disconnection of the cable C.

In the hand 2B, it is preferable to secure a separation distance D between the first gripping section 21 and the second gripping section 22 sufficiently larger than width W of the second gripping section 22. Consequently, later processes are smoothly performed.

Moving Step S2

Subsequently, the robot 1 initializes the tactile sensors 251 and 252 and sets outputs to 0 (zero). Subsequently, as shown in FIG. 7, in a state in which the cable C is gripped by the hand 2B, the robot 1 moves the cable C to an X-axis direction minus side, that is, the first gripping section 21 side relatively to the hand 2B. Specifically, the robot 1 moves the hand 2A to the X-axis direction minus side with the multi-joint arm 13 to pull the cable C to the X-axis direction minus side and moves the cable C to the X-axis direction minus side with respect to the hand 2B. However, not only this, but the robot 1 may move the hand 2B to an X-axis direction plus side with the multi-joint arm 14 to thereby move the cable C to the X-axis direction minus side with respect to the hand 2B. This movement is continued until a later stopping step S4.

At this time, the cable C moves while rubbing against the first and second gripping sections 21 and 22, that is, slides. Therefore, in this step, the elastic bodies 261 and 262 are deformed to be pulled to the X-axis direction minus side by the sliding of the cable C. Force Fx in the X-axis direction acts on the tactile sensors 251 and 252 according to the deformation. That is, in the moving step S2, since the elastic bodies 261 and 262 are deformed to be pulled in the X-axis direction while being deformed to be crushed in the Z-axis direction, force Fz in the Z-axis direction and the force Fx in the X-axis direction due to the deformation act on the tactile sensors 251 and 252. Therefore, the force Fx in the X-axis direction and the force Fz in the Z-axis direction are output from the tactile sensors 251 and 252.

Detecting Step S3

When the moving step S2 is continued, as shown in FIG. 8, the cable C slips out from the second gripping section 22 at certain timing. A terminal end Ce of the cable C is located between the first gripping section 21 and the second gripping section 22. When the cable C slips out from the second gripping section 22, since the forces Fz and Fx generated by the sliding with the cable C stop acting on the tactile sensor 252, the forces Fx and Fx are not output from the tactile sensor 252. Therefore, the robot 1 detects, based on a change in an output from the tactile sensor 252, that the cable C has slipped out from the second gripping section 22.

Examples of the forces Fx and Fz output from the tactile sensor 252 during the moving step S2 are shown in FIGS. 9 and 10. FIGS. 9 and 10 indicate that an output of the tactile sensor 252 is initialized at the number of steps "0", the moving step S2 is started at the number of steps "10", and the cable C slips out from the second gripping section 22 at the number of steps "29". In this way, the cable C slips out from the second gripping section 22, whereby the output from the tactile sensor 252 clearly changes. Therefore, the robot 1 can easily detect that the cable C has slipped out from the second gripping section 22.

On the other hand, in a state shown in FIG. 8, the cable C has not slipped out from the first gripping section 21. Therefore, the forces Fx and Fz are continuously output from the tactile sensor 251. Therefore, the forces Fz and Fx are not output only from the tactile sensor 252 of the tactile sensors 251 and 252. Consequently, the robot 1 can detect that the cable C has slipped out from the second gripping section 22 and the terminal end Ce of the cable C is present between the first gripping section 21 and the second gripping section 22. In this way, based on the forces Fz and Fx, it is possible to simply and surely detect that the cable C has slipped out from the second gripping section 22 and the terminal end Ce of the cable C is present between the first gripping section 21 and the second gripping section 22.

During the moving step S2, force Fy in the Y-axis direction is output from the tactile sensors 251 and 252 other than the forces Fx and Fz. A state, specifically, a bending state of the cable C can be detected from the force Fy. For example, as the force Fy is stronger, it is possible to detect that the cable C bends in the direction of the force Fy. Therefore, the robot 1 can perform the moving step S2 while grasping the state of the cable C. Consequently, the robot 1 can more smoothly perform the moving step S2.

An example of the force Fy output from the tactile sensor 252 during the moving step S2 is shown in FIG. 11. Like FIGS. 9 and 10, FIG. 11 indicates that an output of the tactile sensor 252 is initialized at the number of steps "0", the moving step S2 is started at the number of steps "10", and the cable C slips out from the second gripping section 22 at the number of steps "29". It is also possible to detect, based on a change in the force Fy, that the cable C has slipped out from the second gripping section 22. However, as it is seen from FIG. 11, the force Fy is smaller compared with the forces Fx and Fz. Therefore, the accuracy of the detection based on the force Fy is likely to be lower compared with the detection based on the forces Fx and Fz.

Stopping Step S4

When detecting in the detecting step S3 that the cable C slips out from the second gripping section 22 and the terminal end Ce of the cable C is present between the first gripping section 21 and the second gripping section 22, the robot 1 quickly stops pulling the cable C to the X-axis direction minus side. Consequently, as shown in FIG. 8, a state in which the terminal end Ce is located between the first gripping section 21 and the second gripping section 22 is maintained. As explained above, the separation distance D between the first gripping section 21 and the second gripping section 22 is set sufficiently wider than the width W of the second gripping section 22. Therefore, after the cable C slips out from the second gripping section 22, by quickly stopping pulling the cable C to the X-axis direction minus side, it is possible to secure length L from the first gripping section 21 to the terminal end Ce of the cable C larger than the width W of the second gripping section 22. Consequently, it is easy to perform later work.

Second Gripping Section Moving Step S5

Figure 12:
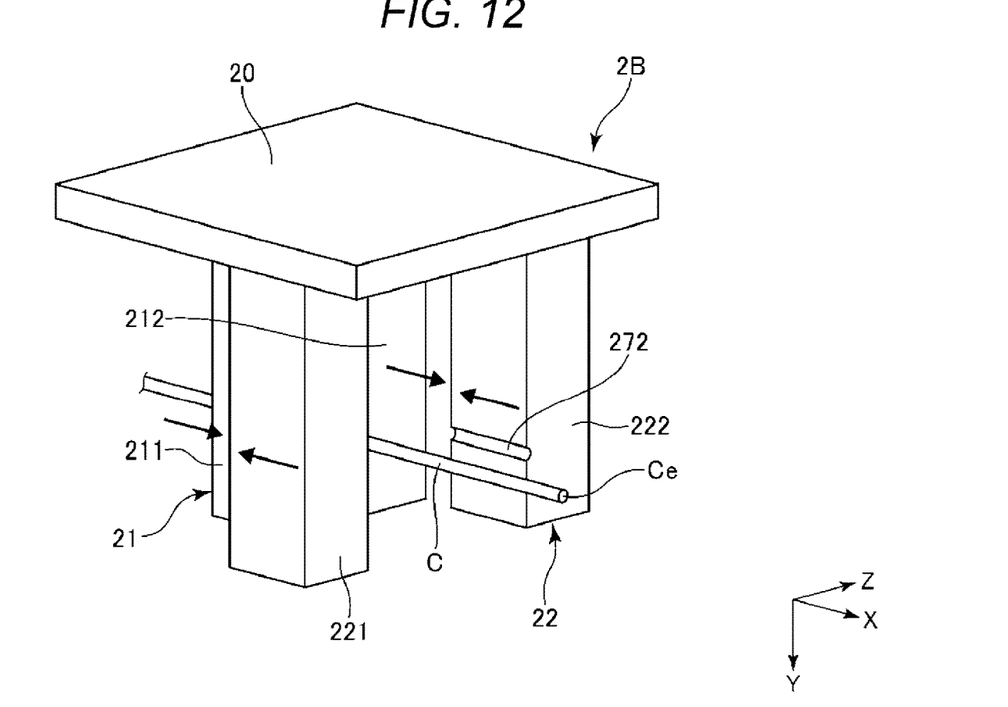
FIG. 12 is a perspective view for explaining a terminal end detection method for a cable.

Subsequently, the second gripping section 22 is opened. As shown in FIG. 12, the first gripping section 21 and the second gripping section 22 are relatively moved along the X axis and the second gripping section 22 is located further on the X-axis direction minus side, that is, the first gripping section 21 side than the terminal end Ce of the cable C. In FIG. 12, because of the configuration of the hand 2B, by moving the first gripping section 21 to the X-axis direction plus side and moving the second gripping section 22 to the X-axis direction minus side, the gripping section 22 is located further on the X-axis direction minus side than the terminal end Ce of the cable C.

Second Gripping Step Gripping Step S6

Figure 13:
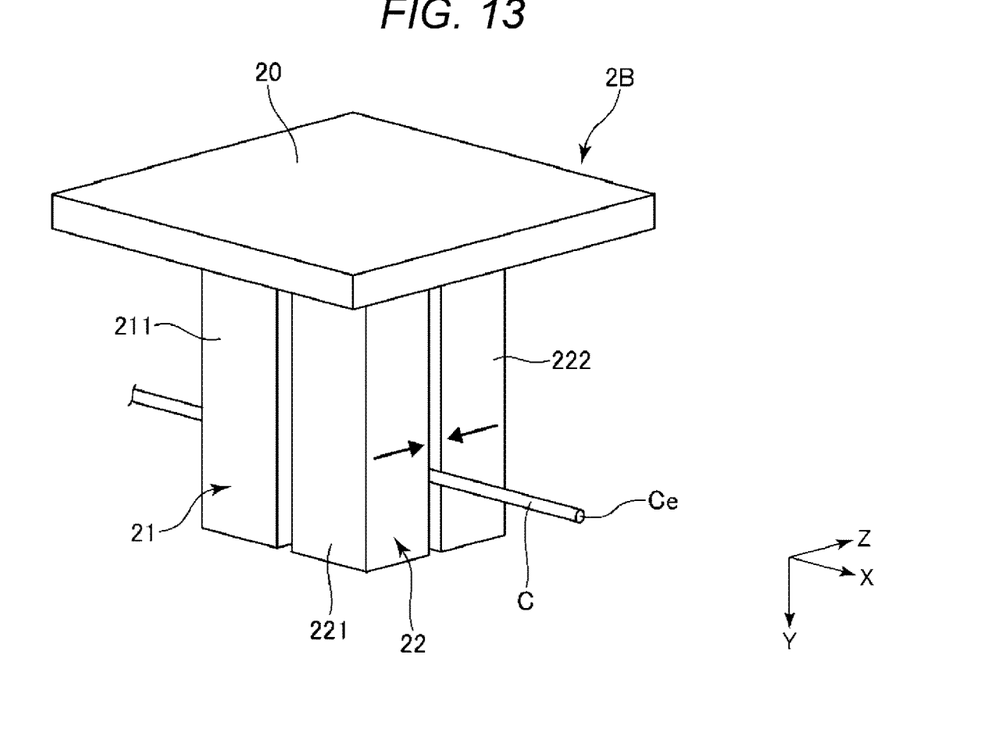
FIG. 13 is a perspective view for explaining the terminal end detection method for the cable.

Subsequently, as shown in FIG. 13, the cable C is gripped again by the second gripping section 22, that is, a pair of finger sections 221 and 222. Consequently, the cable C is gripped by the first gripping section 21 and the second gripping section 22 and the terminal end Ce of the cable C is projected from the second gripping section 22 to the X-axis direction plus side. Therefore, it is easy to approach the terminal end Ce and perform predetermined work on the terminal end Ce.

Work Step S7

Figure 14:
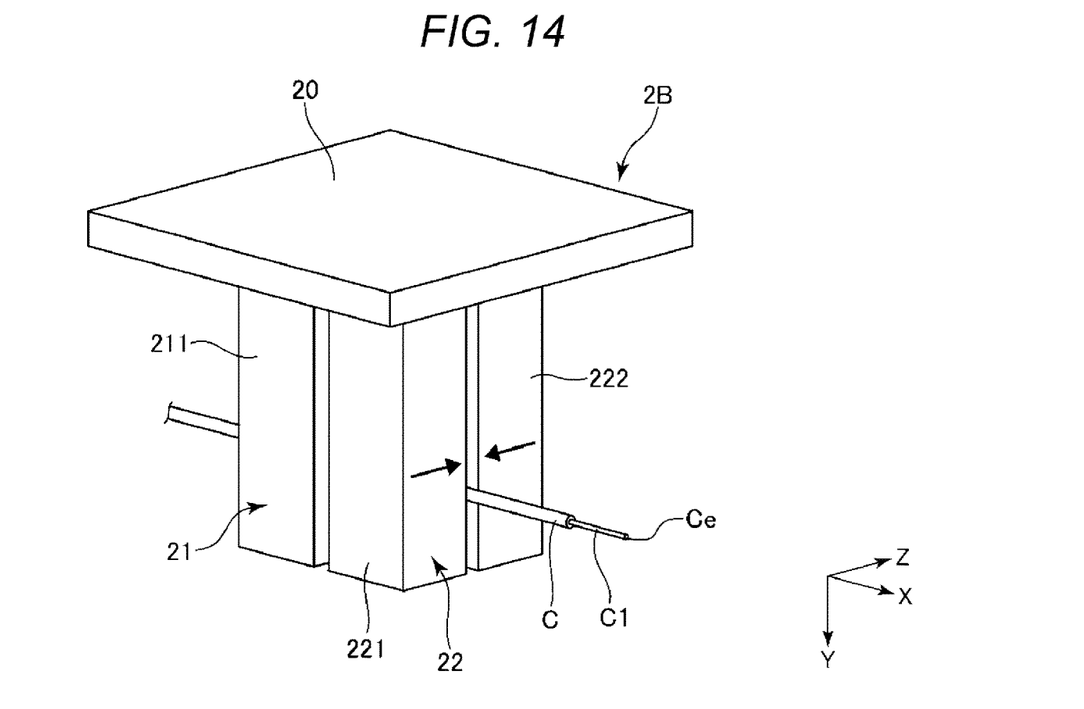
FIG. 14 is a perspective view for explaining the terminal end detection method for the cable.
Figure 15:
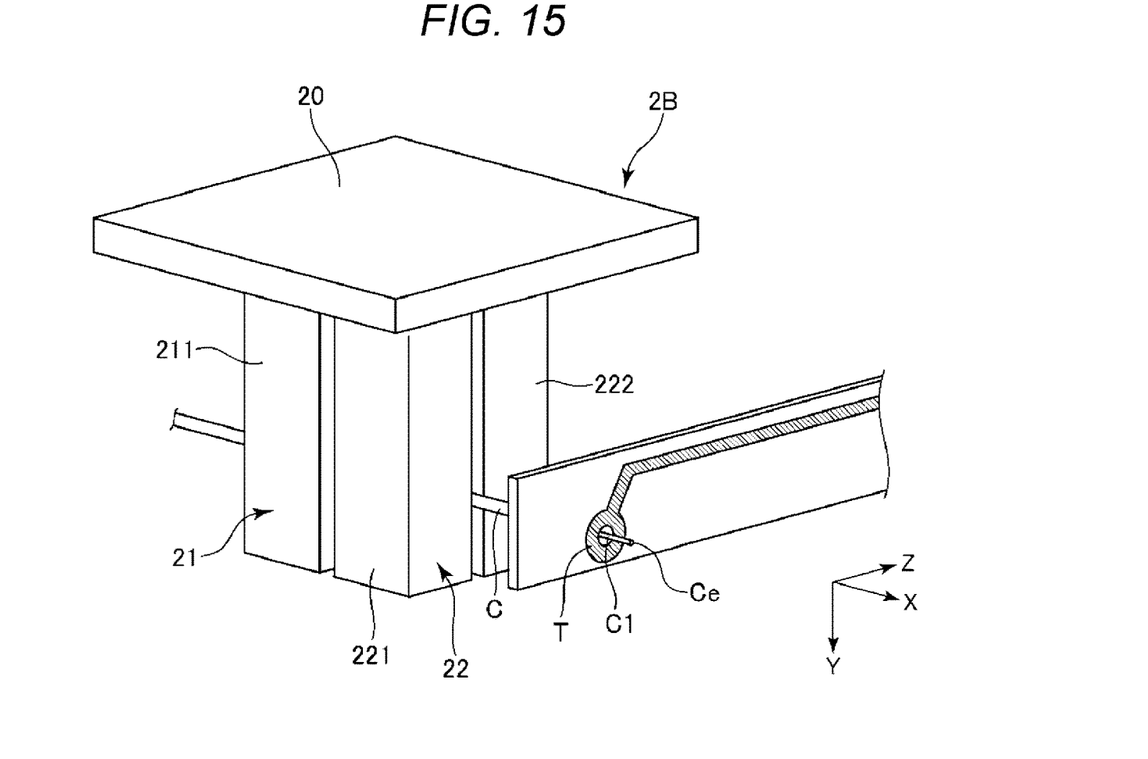
FIG. 15 is a perspective view for explaining the terminal end detection method for the cable.
Figure 16:
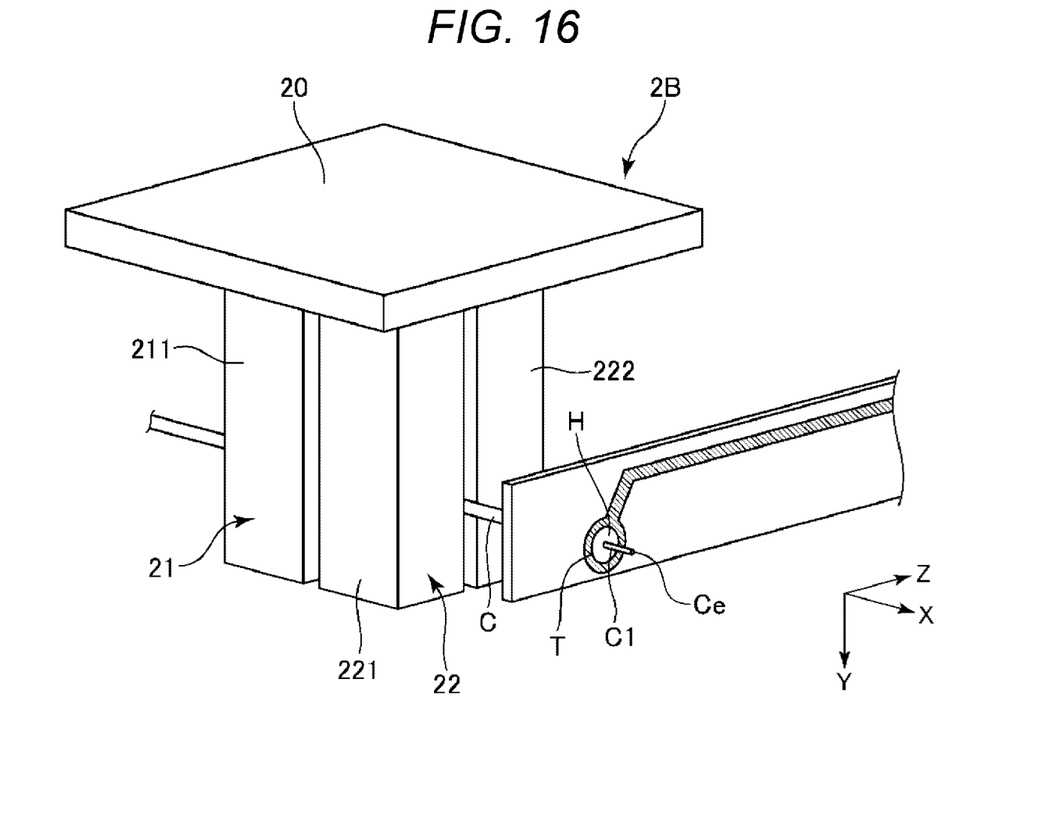
FIG. 16 is a perspective view for explaining the terminal end detection method for the cable.

Subsequently, predetermined work is performed on the terminal end Ce. As explained above, since the terminal end Ce of the cable C is projected from the second gripping section 22, it is easy to perform the predetermined work on the terminal end Ce. The predetermined work is not particularly limited. In this embodiment, first, work for removing a film of the cable C to expose a core material C1 on the inside as shown in FIG. 14, inserting the terminal end Ce into a hole-shaped terminal T as shown in FIG. 15, and connecting the terminal end Ce and the terminal T with solder H as shown in FIG. 16 is performed.

The terminal end detection method for the cable C using the robot 1 is explained above. As explained above, such a terminal end detection method is a cable terminal end detection method for detecting the terminal end of the linear cable C including, when two axes crossing each other are represented as an X axis and a Z axis, the gripping step S1 for gripping, using the hand 2B including the first gripping section 21 and the second gripping section 22 disposed to be separated on the X axis and configured to open and close in a direction along the Z axis, the cable C in two places separated in a longitudinal direction with the first gripping section 21 and the second gripping section 22, the moving step S2 for, in a state in which the cable C is gripped by the hand 2B, moving the cable C to the first gripping section 21 side in a direction along the X axis relatively to the hand 2B, and the detecting step S3 for detecting, with the tactile sensor 252 disposed in the second gripping section 22 to be in contact with the cable C, that the cable C has slipped out from the second gripping section 22 and detecting that the terminal end Ce of the cable C is located between the first gripping section 21 and the second gripping section 22. With such a method, it is possible to simply and easily detect the terminal end Ce of the cable C. Since the terminal end Ce can be detected while being gripped by the hand 2B, it is possible to smoothly shift to work after that and work efficiency is improved.

As explained above, in the detecting step S3, it is detected based on the force Fx in the direction along the X axis applied to the tactile sensor 252 that the cable C has slipped out from the second gripping section 22. Consequently, it is possible to simply and surely detect that the cable C has slipped out from the second gripping section 22.

As explained above, in the detecting step S3, it is detected based on the force Fz in the direction along the Z axis applied to the tactile sensor 252 that the cable C has slipped out from the second gripping section 22. Consequently, it is possible to simply and surely detect that the cable C has slipped out from the second gripping section 22.

As explained above, when an axis crossing the X axis and the Z axis is represented as a Y axis, in the detecting step S3, a state of the cable C is detected based on the force Fy in a direction along the Y axis applied to the tactile sensor 252. Consequently, it is possible to simply and surely detect the state of the cable C.

As explained above, the first gripping section 21 and the second gripping section 22 can relatively move in the direction along the X axis. The terminal end detection method includes, after the detecting step S3, the stopping step S4 for stopping the relative movement of the hand 2B and the cable C at the time when the terminal end Ce of the cable C is located between the first gripping section 21 and the second gripping section 22, the second gripping section moving step S5 for relatively moving the first gripping section 21 and the second gripping section 22 along the X axis and locating the second gripping section 22 further on the first gripping section 21 side than the terminal end Ce of the cable C, and a second gripping section gripping step S6 for gripping the cable C with the second gripping section 22. Consequently, the terminal end Ce of the cable C can be projected to the outer side of the hand 2. Therefore, it is possible to smoothly perform work after that.

As explained above, the terminal end detection method includes, after the second gripping section gripping step S6, the work step S7 for performing predetermined work on the terminal end Ce of the cable C. Consequently, the terminal end Ce of the cable C can be projected to the outer side of the hand 2. Therefore, it is possible to easily perform this step.

As explained above, the hand 2B includes, when two axes crossing each other are represented as an X axis and a Z axis, the first gripping section 21 and the second gripping section 22 configured to relatively move in a direction along the X axis and open and close in a direction along the Z axis, the tactile sensor 252 disposed in the second gripping section 22, and the elastic body 262 covering the tactile sensor 252. With such a configuration, the hand 2B has a configuration suitable for the terminal end detection method explained above.

The cable terminal end detection method and the hand according to the present disclosure are explained above with reference to the embodiment shown in the figures. However, the present disclosure is not limited to this. The components of the sections can be replaced with any components having the same functions. Any other components may be added to the present disclosure. In the embodiment explained above, the X axis, the Y axis, and the Z axis are orthogonal to one another. However, the X axis, the Y axis, and the Z axis only have to cross and may not be orthogonal.

In the embodiment, the robot 1 pulls the cable C to the X-axis direction minus side with respect to the hand 2B using the hand 2A. However, a method of pulling the cable C is not particularly limited. For example, the cable C may be pulled using another robot or device. For example, the starting end of the cable C may be fixed to a fixing member different from the robot 1. The cable C may be gripped by only the hand 2B. By sliding the hand 2B to the X-axis direction plus side, the cable C may be moved to the X-axis direction minus side with respect to the hand 2B.

What is claimed is:

1. A cable terminal end detection method for detecting a terminal end of a linear cable, the cable terminal end detection method comprising, when two axes crossing each other are represented as an X axis and a Z axis:

a gripping step for gripping, using a hand including a first gripping section and a second gripping section disposed to be separated on the X axis and configured to open and close in a direction along the Z axis, the cable in two places separated in a longitudinal direction with the first gripping section and the second gripping section;

a moving step for, in a state in which the cable is gripped by the hand, moving the cable to the first gripping section side in a direction along the X axis relatively to the hand by opening and closing the first gripping section and the second gripping section in a direction along the Z axis; and a detecting step for detecting, with a tactile sensor disposed in the second gripping section to be in contact with the cable, that the cable slipped out from the second gripping section and detecting that the terminal end of the cable is located between the first gripping section and the second gripping section, wherein the first gripping section and the second gripping section relatively move in the direction along the X axis, and the cable terminal end detection method further comprises, after the detecting step:

a stopping step for stopping the relative movement of the hand and the cable when the terminal end of the cable is located between the first gripping section and the second gripping section;

a second gripping section moving step for relatively moving the first gripping section and the second gripping section along the X axis and locating the second gripping section further on the first gripping section side than the terminal end of the cable; and a second gripping section gripping step for gripping the cable with the second gripping section so that the terminal end of the cable is projected from the second gripping section.

2. The cable terminal end detection method according to claim 1, wherein, in the detecting step, it is detected based on force in the direction along the X axis applied to the tactile sensor that the cable slipped out from the second gripping section.

3. The cable terminal end detection method according to claim 1, wherein, in the detecting step, it is detected based on force in the direction along the Z axis applied to the tactile sensor that the cable slipped out from the second gripping section.

4. The cable terminal end detection method according to claim 1, wherein, when an axis crossing the X axis and the Z axis is represented as a Y axis, in the detecting step, a state of the cable is detected based on force in a direction along the Y axis applied to the tactile sensor.

5. The cable terminal end detection method according to claim 1, further comprising, after the second gripping section gripping step, a work step for performing predetermined work on the terminal end of the cable.

6. A hand for the cable terminal end detection method for detecting a terminal end of a linear cable according to claim 1, comprising, when two axes orthogonal to each other are represented as an X axis and a Z axis:

a first gripping section and a second gripping section configured to relatively move in a direction along the X axis and open and close in a direction along the Z axis;

a tactile sensor disposed in the second gripping section; and an elastic body covering the tactile sensor.

* * * * *